(12) United States Patent
Churgin et al.

(10) Patent No.: US 12,475,884 B2
(45) Date of Patent: Nov. 18, 2025

(54) AUTOMATED CALL SUMMARIZATION BASED ON FILTERED UTTERANCES

(71) Applicant: Aetna Inc., Hartford, CT (US)

(72) Inventors: Matthew A. Churgin, Lansing, MI (US); Sheikh Sadid Al Hasan, Weymouth, MA (US); Prasad Telukuntla, Fremont, CA (US)

(73) Assignee: Aetna Inc., Hartford, CT (US)

( * ) Notice: Subject to any disclaimer, the term of this patent is extended or adjusted under 35 U.S.C. 154(b) by 347 days.

(21) Appl. No.: 18/312,201

(22) Filed: May 4, 2023

(65) Prior Publication Data

US 2024/0371367 A1 Nov. 7, 2024

(51) Int. Cl.
| | |
|---|---|
| G10L 15/02 | (2006.01) |
| G10L 15/04 | (2013.01) |
| G10L 15/16 | (2006.01) |
| G10L 15/18 | (2013.01) |
| G10L 15/26 | (2006.01) |
| G10L 17/18 | (2013.01) |
| H04M 3/51 | (2006.01) |

(52) U.S. Cl.
CPC .......... *G10L 15/1822* (2013.01); *G10L 15/02* (2013.01); *G10L 15/04* (2013.01); *G10L 15/16* (2013.01); *G10L 15/26* (2013.01); *G10L 17/18* (2013.01); *H04M 3/5175* (2013.01)

(58) Field of Classification Search
None
See application file for complete search history.

(56) References Cited

U.S. PATENT DOCUMENTS

| | | | |
|---|---|---|---|
| 10,972,607 B1 | 4/2021 | Graham | |
| 11,562,735 B1* | 1/2023 | Gupta | G10L 15/1822 |
| 2020/0327197 A1* | 10/2020 | Bhowal | G06N 5/041 |
| 2021/0004817 A1 | 1/2021 | Adibi | |
| 2021/0126999 A1 | 4/2021 | Sachdev | |
| 2022/0038577 A1 | 2/2022 | Rosenberg | |
| 2022/0108080 A1* | 4/2022 | Munavalli | G06N 3/08 |
| 2023/0063713 A1* | 3/2023 | Lukyanenko | H04L 51/046 |
| 2023/0112369 A1* | 4/2023 | Chopra | G06N 3/044 |
| | | | 705/304 |

* cited by examiner

*Primary Examiner* — Nafiz E Hoque
(74) *Attorney, Agent, or Firm* — Patent Law Works LLP

(57) ABSTRACT

Systems and methods for automated summarization of customer service calls in a specialized field, such as medical services and insurance, are disclosed. Call transcripts are processed to determine the utterances and corresponding speakers in a customer service call. A feature vector is generated for each utterance and processed through a trained intent model to assign intent labels. The utterances are then filtered based on the intent labels to generate an extractive summary. The extractive summary is processed through a trained summarization model to generate a natural language summary for the customer service call.

20 Claims, 7 Drawing Sheets

| Extractive Summary | | |
|---|---|---|
| Speaker | Transcript | Intent |
| Customer | My Name Is Julia Jones And Uh I Got Another Problem I Got Um An Infection In My Foot And I Went To The Urgent Care And That's Who Diagnosed It With The Infection They Put Me On An Antrplartic But What I'm Trying To Find Out There As A Doctor They Rec Fhe's In My Plan L | memberquestion |
| Agent | Pay So You're Calling In Te Day To Check And See If There's A Doctor Farley In Network With | csrchecking |
| Customer | As And Yeah In My Plan In Medicare Cause Uh Sometimes They Tell Me They're In The Plan And Then When I Get That It Said You're Not In The Plan Cause You're Medicare And We Don't Accept Medicare Patients To Make Sure It's Met You Know He's In Medicare | memberquestion |
| Agent | Thank You So Much So Let Me See I'm Looking Up A Doctor Farley Let's See Think Oes Foots Prussh Fis I'm Just Checking To See If This Is The One Um Could It Be Zachary Farley Yes | csrchecking |
| Agent | It Is Okay So I Did Find Him In Network And I'm Just Checking The Network I D Just To Make Sure He's In Network With Your Plan | csrchecking |
| Agent | No Problem Yes Ma'am So He Sure Is It Looks Right Here It Says Medicare P P O So Yeh Oight See Him | csrchecking |
| Agent | Thank You So Much I'll Go Ahead And Forward You Over Now | nextstep |

← 422  ← 424  ← 426

Natural language Summary

Julia Jones got an infection in her foot. She went to urgent care and was put on an antibiotic. She is trying to find a doctor in her network. Agent found a doctor Zachary Farley. Julia wants to make sure he's in her plan.

AUTOMATED CALL SUMMARIZATION BASED ON FILTERED UTTERANCES

TECHNICAL FIELD

The present disclosure generally relates to processing of call data from customer service representatives (CSR), and, more particularly, to improving accuracy and use of automated call summaries.

BACKGROUND

Enterprises in specialized fields, such as medical services, pharmacy, and insurance, may have large repositories of call data directly related to their services, operations, and specialized nomenclature. This call data may reflect interactions between CSRs and customers, patients, or members on a variety of topics. Generically trained speech-to-text and summarization models may not have the desired accuracy for automated processing of specialized calls. Further, the limited accuracy of such call summaries may limit their use by both CSRs and as input data for other data mining activities.

There is a need for more accurate automated call summarization for customer service calls and improved integration with other call and user data to drive improved customer interactions and outreach.

SUMMARY

The present disclosure describes, among other things, various aspects for automated call summarization based on filtered utterances. More specifically, a trained intent model is used to process utterances from a call transcript to determine an intent label for each utterance and then those utterances are filtered before being processed through a trained summarization model. This technology improves the automated generation of call summaries, as well as their further processing, storage, and use.

One general aspect includes a computer-implemented method that includes: accessing a call transcript data object for a customer service call; determining a plurality of utterances attributed to a plurality of speakers in the customer service call; generating a feature vector for each utterance of the plurality of utterances; processing each feature vector through a trained intent model to assign an intent label to each utterance; filtering, based on a filter set of intent labels, the plurality of utterances to generate an extractive summary data object, where the extractive summary data object may include a subset of the plurality of utterances and corresponding intent labels and speaker identifiers for the subset of the plurality of utterances; and generating, based on the extractive summary data object and a trained summarization model, a natural language summary data object for the customer service call.

Examples may include one or more of the following features. The computer-implemented method may include: associating the natural language summary data object with a call record for the customer service call; and automatically displaying, on an interface display of a customer service representative computing system, a visual representation of the natural language summary data object in response to the customer service representative computing system accessing the call record. The computer-implemented method may include: classifying, based on the extractive summary data object and a trained classification model, a call topic of the customer service call; and associating a call topic label for the call topic with the natural language summary data object. The computer-implemented method may include: accessing an audio data object for the customer service call; determining, from the audio data object and using a trained speaker segmentation model, the plurality of speakers in the customer service call; converting, using a trained speech-to-text model, the audio data object to the call transcript data object; labelling the plurality of speakers in the call transcript data object; and embedding the plurality of utterances in the call transcript data object, where determining the plurality of utterances is based on embeddings in the call transcript data object. The computer-implemented method may include: determining a training data pool comprised of a plurality of call transcript data objects; determining a plurality of training utterances and corresponding feature vectors for the plurality of call transcript data objects; iteratively determining a set of weak supervision intent labelling rules for training the trained intent model; iteratively processing the plurality of training utterances and corresponding feature vectors through the trained intent model to determine weighting coefficients for the trained intent model and at least one model acceptance metric; and generating a master set of intent labels for the trained intent model, where the filter set of intent labels is a selected subset of the master set of intent labels. The computer-implemented method may include: generating, from the natural language summary data object, an embedding and at least one corresponding feature vector for the natural language summary data object; and storing, associated with a member identifier for the customer service call, the embedding and at least one corresponding feature vector for processing through at least one automated processing model. The computer-implemented method may include: determining a plurality of claim identifiers associated with the member identifier; determining, based on the natural language summary data object and a plurality of claim records corresponding to the plurality of claim identifiers, at least one claim correlation value for the natural language summary data object; determining, based on a comparison of the at least one claim correlation value and a claim relatedness threshold, at least one related claim identifier from the plurality of claim identifiers; and associating the at least one related claim identifier with a call record for the customer service call. The computer-implemented method may include: determining at least one prior call record associated with the member identifier and may include at least one prior natural language summary data object; determining, based on the natural language summary data object and the at least one prior natural language summary data object, at least one call correlation value for the natural language summary data object; determining, based on a comparison of the at least one call correlation value and a call relatedness threshold, at least one related call record from the at least one prior call record; associating the at least one related call record with a call record for the customer service call; and automatically displaying, on an interface display of a customer service representative computing system, a visual representation of the natural language summary data object in response to the customer service representative computing system accessing the at least on related call record. The computer-implemented method may include: extracting, from the natural language summary data object, at least one key term having a key term type; determining, based on the member identifier and the key term type, a plurality of data records may include corresponding key terms; determining variance values among the at least one key term and the corresponding key terms; determining, based on the variance values, the at least one key term is in error; and correcting, based on the corresponding key terms, the at least on key term in the natural language summary data object. The computer-implemented method may include: associating the embedding and at least one corresponding feature vector for the natural language summary data object with a member feature set; processing, using the at least one automated processing model, the member feature set to determine a next best action for the member identifier; and automatically initiating, based on the next best action, communication to a member associated with the member identifier.

Another general aspect includes a system that includes one or more processors and a memory storing instructions that, when executed, cause the one or more processors to: access a call transcript data object for a customer service call; determine a plurality of utterances attributed to a plurality of speakers in the customer service call; generate a feature vector for each utterance of the plurality of utterances; process each feature vector through a trained intent model to assign an intent label to each utterance; filter, based on a filter set of intent labels, the plurality of utterances to generate an extractive summary data object, where the extractive summary data object may include a subset of the plurality of utterances and corresponding intent labels and speaker identifiers for the subset of the plurality of utterances; and generate, based on the extractive summary data object and a trained summarization model, a natural language summary data object for the customer service call.

Examples may include one or more of the following features. The system where the instructions may further include instructions to: associate the natural language summary data object with a call record for the customer service call; and automatically display, on an interface display of a customer service representative computing system, a visual representation of the natural language summary data object in response to the customer service representative computing system accessing the call record. The instructions may further include instructions to: classify, based on the extractive summary data object and a trained classification model, a call topic of the customer service call; and associate a call topic label for the call topic with the natural language summary data object. The instructions may further include instructions to: access an audio data object for the customer service call; determine, from the audio data object and using a trained speaker segmentation model, the plurality of speakers in the customer service call; convert, using a trained speech-to-text model, the audio data object to the call transcript data object; label the plurality of speakers in the call transcript data object; and embed the plurality of utterances in the call transcript data object, where determining the plurality of utterances is based on embeddings in the call transcript data object. The instructions further may include instructions to: determine a training data pool may include of a plurality of call transcript data objects; determine a plurality of training utterances and corresponding feature vectors for the plurality of call transcript data objects; iteratively determine a set of weak supervision intent labelling rules for training the trained intent model; iteratively process the plurality of training utterances and corresponding feature vectors through the trained intent model to determine weighting coefficients for the trained intent model and at least one model acceptance metric; and generate a master set of intent labels for the trained intent model, where the filter set of intent labels is a selected subset of the master set of intent labels. The instructions may further include instructions to: generate, from the natural language summary data object, an embedding and at least one corresponding feature vector for the natural language summary data object; store, associated with a member identifier for the customer service call, the embedding and at least one corresponding feature vector for processing through at least one automated processing model; associate the embedding and at least one corresponding feature vector for the natural language summary data object with a member feature set; process, using the at least one automated processing model, the member feature set to determine a next best action for the member identifier; and automatically initiate, based on the next best action, communication to a member associated with the member identifier. The instructions may further include instructions to: determine a plurality of claim identifiers associated with a member identifier; determine, based on the natural language summary data object and a plurality of claim records corresponding to the plurality of claim identifiers, at least one claim correlation value for the natural language summary data object; determine, based on a comparison of the at least one claim correlation value and a claim relatedness threshold, at least one related claim identifier from the plurality of claim identifiers; and associate the at least one related claim identifier with a call record for the customer service call. The instructions may further include instructions to: determine at least one prior call record associated with a member identifier and may include at least one prior natural language summary data object; determine, based on the natural language summary data object and the at least one prior natural language summary data object, at least one call correlation value for the natural language summary data object; determine, based on a comparison of the at least one call correlation value and a call relatedness threshold, at least one related call record from the at least one prior call record; associate the at least one related call record with a call record for the customer service call; and automatically display, on an interface display of a customer service representative computing system, a visual representation of the natural language summary data object in response to the customer service representative computing system accessing the at least on related call record. The instructions may further include instructions to: extract, from the natural language summary data object, at least one key term having a key term type; determine, based on a member identifier and the key term type, a plurality of data records may include corresponding key terms; determine variance values among the at least one key term and the corresponding key terms; determine, based on the variance values, the at least one key term is in error; and correct, based on the corresponding key terms, the at least on key term in the natural language summary data object.

Still another general aspect includes a non-volatile computer readable memory storing instructions for: accessing a call transcript data object for a customer service call; determining a plurality of utterances attributed to a plurality of speakers in the customer service call; generating a feature vector for each utterance of the plurality of utterances; processing each feature vector through a trained intent model to assign an intent label to each utterance; filtering, based on a filter set of intent labels, the plurality of utterances to generate an extractive summary data object, wherein the extractive summary data object comprises a subset of the plurality of utterances and corresponding intent labels and speaker identifiers for the subset of the plurality of utterances; and generating, based on the extractive summary data object and a trained summarization model, a natural language summary data object for the customer service call.

It should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

FIG. 4 illustrates an example call transcript and resulting extractive summary.

FIG. 5 illustrates an example extractive summary and resulting natural language summary.

DETAILED DESCRIPTION

As set forth in detail below, the technology described herein improves the operation of customer service representative (CSR) computing systems to generate, display, and process call summaries, such as natural language call summaries based on filtered utterances. The technology supports call center and other operations, such customer support applications and outbound marketing systems. In some configurations, the technology automatically reconfigures the display of a CSR client system to display a visual representation of a natural language summary of a relevant prior call based on a natural language summary data object stored in memory and associated with a current customer interaction, such as a new call related to the same customer, subject matter, or claim.

Figure 1:
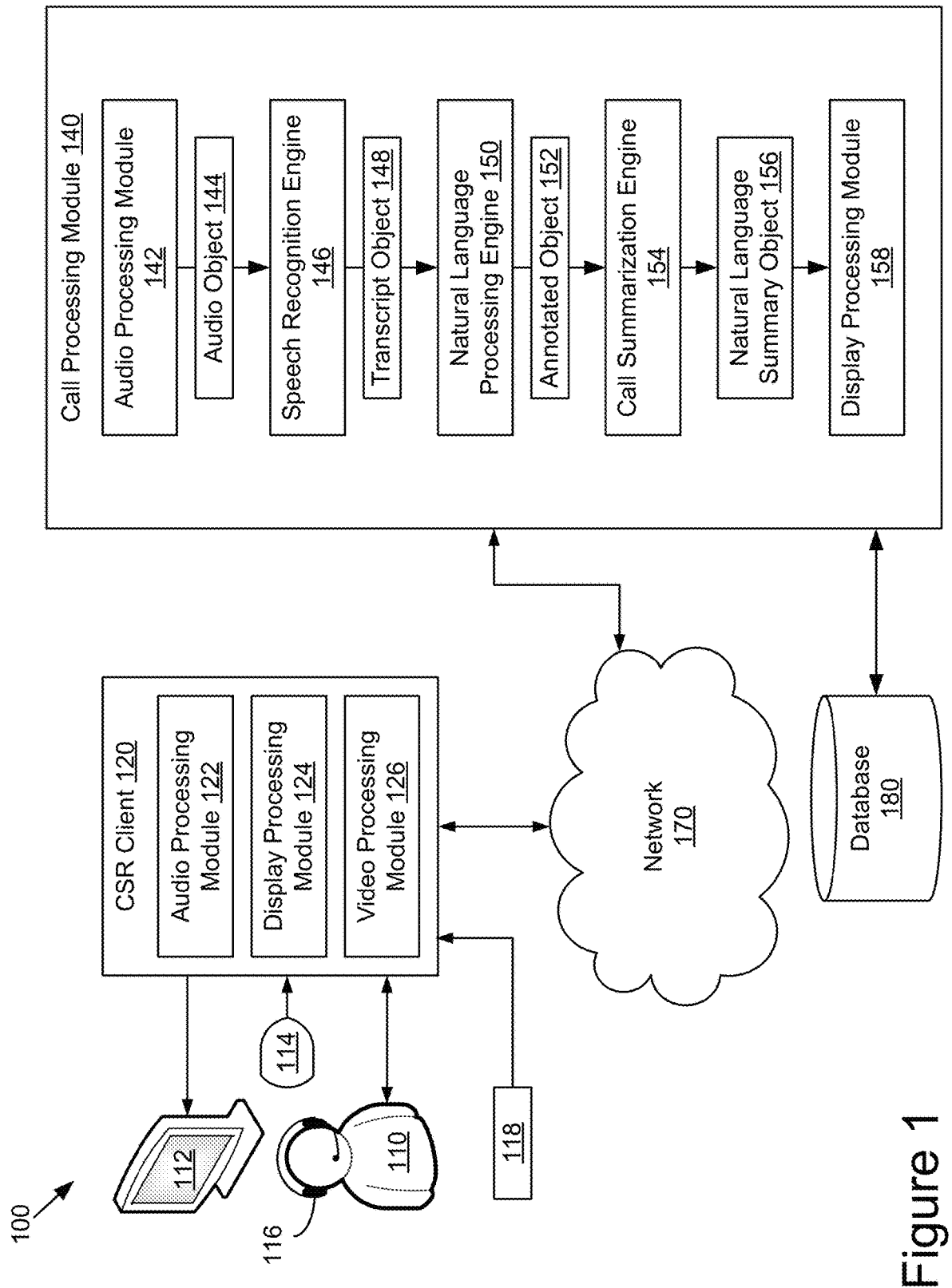
FIG. 1 illustrates a block diagram of an example customer service system using call summarization.

FIG. 1 illustrates a block diagram of a customer service system 100 configured for call summarization. System 100 may include a CSR client 120, a call processing module 140, one or more supporting databases 180, and a network 170 configured to couple CSR client 120, call processing module 140, and database 180. In some configurations, CSR client 120, call processing module 140, and/or database 180 may be embodied in software operating on one or more computer systems. For example, CSR client 120 may be hosted on a computer system used by a CSR to manage and respond to customer service calls, call processing module 140 may be hosted on an enterprise server system providing on-demand call processing, and database 180 may be hosted on a distributed storage network storing an enterprise data warehouse. CSR client 120, call processing module 140, and/or database 180 may be co-located or may be separated to accommodate remote CSR operations.

Customer service system 100 may include a computer system comprising various input/output (I/O) components for accommodating a CSR 110. For example, CSR 110 may interface or interact with CSR client 120 using a headset 116 which may include a speaker and a microphone connected to the computer system hosting CSR client 120, such as a desktop workstation, laptop, tablet, smartphone, or similar general-purpose or specialized computer system. CSR 110 may also interact with CSR client 120 using a display monitor 112 configured to display customer and/or call related information for use during customer service calls and/or other CSR tasks. CSR 110 may also interact with CSR client 120 using a keyboard 118 and/or other manual input device, such as a mouse, stylus, touchscreen, etc. In some configurations, CSR 110 may interact with CSR client 120 using a camera 114 and/or other I/O peripherals connected to the computer system hosting the CSR client. In addition to interacting with CSR client 120, customer service system 100 may support real-time communication between CSR 110 and a customer, such as through the public switched telephone network, voice-over-internet-protocol (VOIP), and/or another communication standard, for handling customer service calls.

CSR client 120 may include an audio processing module 122 configured to receive audio data from headset 116 and the customer communication channel (which is also provided to headset 116). For example, the audio stream, including both CSR and customer voice channels, for each customer service call may be monitored and captured by audio processing module 122. CSR client 120 may include a display processing module 124 configured to display call and/or CSR workflow information through display monitor 112. For example, display processing module 124 may support the display of visual information, such as visual representations of customer, call, claim, and other data records from database 180, organized in one or more windows or similar application user interfaces on display monitor 112. CSR client 120 may automatically index information related to the customer, call, claim, etc. to enable CSR 110 to access, display, and navigate relevant information during the call. In some configurations, CSR client 120 may include a video processing module 126 configured to manage video-based customer service calls. Video processing module 126 may support extraction of the audio stream from a video call for use by audio processing module 122 and may display the video images (e.g., from camera 114 and/or the customer's video stream) on display monitor 112.

CSR client 120 and call processing module 140 may interact with complementary processes or modules for accommodating the exchange of audio, video, and other call-related data. In some configurations, CSR client 120 and call processing module 140 may include complementary application protocol interfaces (APIs) for exchanging data between the complementary processes or modules. For example, CSR client 120 may receive audio from CSR 110 and the customer, then process the audio with audio processing module 124. The audio may thereafter be exchanged with audio processing module 142 located in call processing module 140. Similarly, call-related data may also be displayed to the CSR 110 using display monitor 112 with the information to be displayed being received by display processing module 126 from display processing module 158 located in call processing module 140.

Call processing module 140 may be configured to process call data, such as a recorded call, in order to generate, store, and display call summaries. As described above, audio processing module 142 may receive the audio data from a service call from audio processing module 122. The audio data may be received in real-time and/or following completion of the service call. For example, the audio data for a call may be stored in an audio data object 144, such as an audio data file complying with pulse-code modulation (PCM), waveform audio file format (WAV), audio interchange file format (AIFF), motion picture experts group (MPEG) audio layer 3 (MP3), advance audio coding (AAC), Windows media audio (WMA), etc. audio data encoding standards. Call processing module 140 may receive or access audio data object 144 and pass it to a trained speech recognition engine 146 for processing.

Speech recognition engine 146 may include one or more trained speech recognition models trained on general speech recognition heuristics and/or a repository of similar customer service call data. In some configurations, speech recognition engine 146 may determine separate speakers, such as one (or more) CSRs and one (or more) customers, and convert the audio data corresponding to each speaker into a text transcript data object 148. For example, text transcript data object 148 may include a plurality of transcribed text utterances ascribed to each speaker and organized in the chronological order in which they occurred during the call. Transcript data object 148 may then be passed to natural language processing engine 150 for classification and annotation of each utterance. In some configurations, a series of machine learning models may be used to improve the quality of the speech-to-text conversion and speaker labeling of speech recognition engine 146.

For example, an upsampling model may be trained by comparing low-quality (training sample) and high-quality (expected outputs) audio data to determine weighting coefficients for a neural network model. The resulting trained upsampling model may use a convolutional neural network to map key features of signal and noise with a customized kernel function to filter out noise with max-pooling techniques for improved sound quality, outputting modified audio data with an effectively increased sample rate over the original audio (e.g., 8 kilohertz (khz) audio data to 16 khz audio data).

As another example, a clustering model may be trained to identify and tag the unique speakers in audio data object 144 for speaker diarization. For example, the speaker diarization model may be based on unsupervised clustering of computed Mel spectrographs for short time windows through Gaussian mixture modelling (GMM) on the spectrogram features to cluster time points and assign that audio data to a given speaker. In some configurations, the GMM algorithm may be configured for more than two expected clusters, since the number of participants in the call may be unknown. For example, multiple customers (e.g., patient, caregiver, insurance holder, etc.) and multiple CSRs (e.g., call transfers, supervisors, quality assurance, etc.) may be present in the same call. An upper limit of multiple expected clusters (e.g., 10 clusters/participants) may be evaluated using minimum Bayesian information criterion (BIC) to determine how many clusters/speakers are appropriate for a given audio file.

As still another example, deep learning speech-to-text models may be fine-tuned based on domain-specific customer service call data. For example, off-the-shelf (pre-trained) speech-to-text models may provide a first-pass speech-to-text conversion and then a domain-specific (e.g., healthcare, insurance, pharmacy, etc.) language model may be applied to the raw speech-to-text outputs to correct phonetic errors in speech-to-text and enable improved recognition of uncommon but high information density tokens, such as medical terminology and common provider names. Additional custom-trained models may also be applied iteratively to the output text tied to customer demographics. For example, customers may be identified during the call by a customer or member identifier, from which customer demographic data, such as geographic location, ethnicity, etc., may be used to select corresponding custom-trained models for processing that audio data object.

As yet another example, a custom classifier may be trained to assign speaker labels (CSR, customer/member, etc.). For example, after speech is converted to text and separated into participant-specific utterances, a bag of words model, term frequency-inverse document frequency (TF-IDF), and bidirectional encoder representations from transformers (BERT) embeddings may be used to predict whether each speaker is a member, agent, care manager, interactive voice response prompt, etc. The TF-IDF and BERT embeddings may be used as features and processed through a multi-class classifier model, such as logistic regression, random forest, gradient boosted trees algorithm, etc., trained to identify the different possible speaker roles. Based on the output of the classifier model, each speaker may be tagged with an appropriate label in transcript data object 148.

Natural language processing engine 150 may include one or more trained natural language processing models configured to process text data from transcript data object 148 to identify and label the content of that text. For example, natural language processing engine 150 may use a combination of general natural language processing models and natural language processing models trained on domain-specific data to determine the intent of each utterance and one or more topics for each utterance and/or the call as a whole. Natural language processing engine 150 may output an annotated transcript data object 152 that comprises both the utterance text and speaker tags from transcript data object 148 and additional tags for utterance intent, call topics, and/or other metadata describing the content of the text. In some configurations, the metadata describing the transcript data may be output to a separate file or database associated with a call record identifier for the customer service call. Annotated transcript data object 152 may then be passed to call summarization engine 150 for extractive filtering of utterances and generation of a natural language summary. In some configurations, a series of machine learning models may be used to implement multiple types of content labeling for natural language processing engine 150.

For example, a language identification model may be trained to identify two or more spoken languages, such as English and Spanish. In some configurations, call transcript data object 148 may include phonetic speech-to-text data for the call and the language identification model may be a binary or multi-class classifier trained based on n-character-grams to predict what language is being spoken. For example, a subset of utterances for one or more speakers may be used to create a 4-character-gram feature space. A truncated singular value decomposition (SVD) may be used to reduce dimensionality. Components meeting a variation threshold value (e.g., 95%) of the original feature space's variation may be selected as the input features to a classifier trained for the languages being identified. A language identification tag may be associated with the call, each speaker, and/or each utterance, depending on the number of languages detected in the text data.

As another example, an utterance intent classifier model may be trained using weak supervision to provide an unsupervised custom classifier of intents for the specific domain. In some configurations, a set of heuristics for weak supervision may be iteratively defined for customer service calls and, more specifically, a specialized domain, such as medical services, pharmacy, or insurance, to define a set of intent labels to apply to each utterance or segment of the call, such as "greeting", "member question", "representative answer", "follow-up question", etc. The intent labels may be specific to the speaker role, e.g., member question or representative question, combining a role label and an intent label. A character-based BERT deep learning model may be used to embed each utterance into a dense vector as the feature input to a multi-class classifier. For each dense vector corresponding to an utterance, the multi-class classifier may output a corresponding intent label. For example, the multi-class classifier may be trained using a pool of call data and a set of fifteen intent labels intended to cover the possible utterance intents in a customer service call. Each utterance processed through the utterance intent classifier model would be assigned to one of the fifteen classes with an associated confidence score. The intent label with the highest confidence score and/or meeting an intent confidence threshold may be assigned that intent label and a corresponding intent label tag may be added to annotated transcript data object 152 in association with the text of that utterance and/or added to other corresponding metadata files or databases.

As still another example, a call topic classifier model may be trained using weak supervision to provide an unsupervised custom classifier of call topics for the specific domain, such as healthcare, insurance, etc. The training process and resulting classifier may be similar to that described above for the utterance intent classifier, but based on a set of heuristics and resulting set of call topic labels, such as "primary care", "specialist", "benefits", "claims", "prior authorization", "status", "scheduling", etc. In some configurations, the set of topic labels may be larger than the set of intent labels to reflect a larger variety in the possible call topics. The corresponding topic label assignment logic may also use a topic confidence threshold to identify more than one topic and/or weighted topic values for the topic labels. For example, an utterance about scheduling a primary care visit and whether that is a covered benefit may be labeled as "primary care", "benefits", and "scheduling". In some configurations, the topic labels for the utterances within a call may be used to determine an overall topic for the call and/or for subsegments of the call and annotated transcript data object 152 may include tags reflecting topics at multiple levels (utterances, groupings, overall, etc.) in the call transcript.

In some configurations, additional processing of audio data object 144 and/or transcript data object 148 may support additional metadata tagging for annotated transcript data object 152. For example, a tone model may be applied to audio data object 144 to determine vocal sentiment for each utterance and a text model may be applied to transcript data object 148 to determine content sentiment for each utterance. Each model may produce weighted sentiment labels for each utterance that may be aggregated in one or more ways to determine overall call sentiment and/or sentiment during time segments or utterance groupings in the call. In some configurations, a combination of audio data based vectors and text data based vectors may be used in a combined sentiment model to label the sentiment of individual utterances, groupings, and/or the call as a whole. These sentiment labels may be added in metadata tags in annotated transcript data object 152 and/or added to other metadata files or databases associated with the call record.

Call summarization engine 154 may include one or more trained natural language processing models configured to process filtered text data from annotated transcript data object 152 to generate a natural language call summary and store it as a natural language summary object 156. For example, call summarization engine 154 may include logic for filtering the utterances in the text transcript based on the content tags, such as intent tags, topic tags, and/or sentiment tags. In some configurations, a set of heuristics may be iteratively determined for selecting utterances that constitute the most important moments of the call. For example, a first set of intent filters may be applied to remove utterances unlikely to contribute to the substance of the call, such as greetings, automated prompts, affirmations, abstentions, etc. In some configurations, a key set of intent labels may be identified, such as member questions, CSR answers, and next steps, and all other intent labels may be filtered out. The resulting filtered set of utterances may be stored as an extractive summary file or data object comprised of the subset of utterances and their corresponding speaker, intent, and/or other tags (e.g., topic, sentiment, etc.).

Call summarization engine 154 may use the extractive summary to generate the inputs to a trained abstractive summary model. For example, the filtered subset of utterances may each be used to generate a feature vector for input into a vector-quantized deep learning model. The abstractive summary model may be based on a preexisting (general) abstractive summary model that is retrained using a pool of extractive summaries and weak or strong supervision. In some configurations, call summarization engine 154 may include additional trained classifier models for identifying and tagging key terms within the extractive summary and/or natural language summary, such as names, locations, identifiers, conditions, and events. For example, one or more classifier models may be trained for domain-specific key terms, such as provider names, plan/claim identifiers, pharmaceutical names, medical terminology, etc. In some configurations, entity recognition for key terms may be executed by natural language processing engine 150 and included in the metadata tags added to annotated data object 152 prior to processing by call summarization engine 154. In some configurations, a call topic may be determined from processing the natural language summary through a call topic classifier similar to that used to annotate the utterances in natural language processing engine 150.

Call summarization engine 154 may output natural language summary data object 156, including the abstracted natural language summary and any additional tags for call topic, key terms, and/or other metadata describing the content of the call. Natural language summary data object 156 and/or corresponding metadata may be stored to database 180 and associated with a call record identifier for the customer service call. Natural language summary data object 156 may then be passed to display processing module 158 for display of the natural language summary to CSR 110 through display monitor 112. For example, when the call record for the call is accessed or a related call is detected and associated with the call record, a visual representation of the natural language summary from natural language summary data object 156 may be automatically displayed to CSR 110 to enable better recall and handling of the new call and/or next steps from the prior call.

Figure 2:
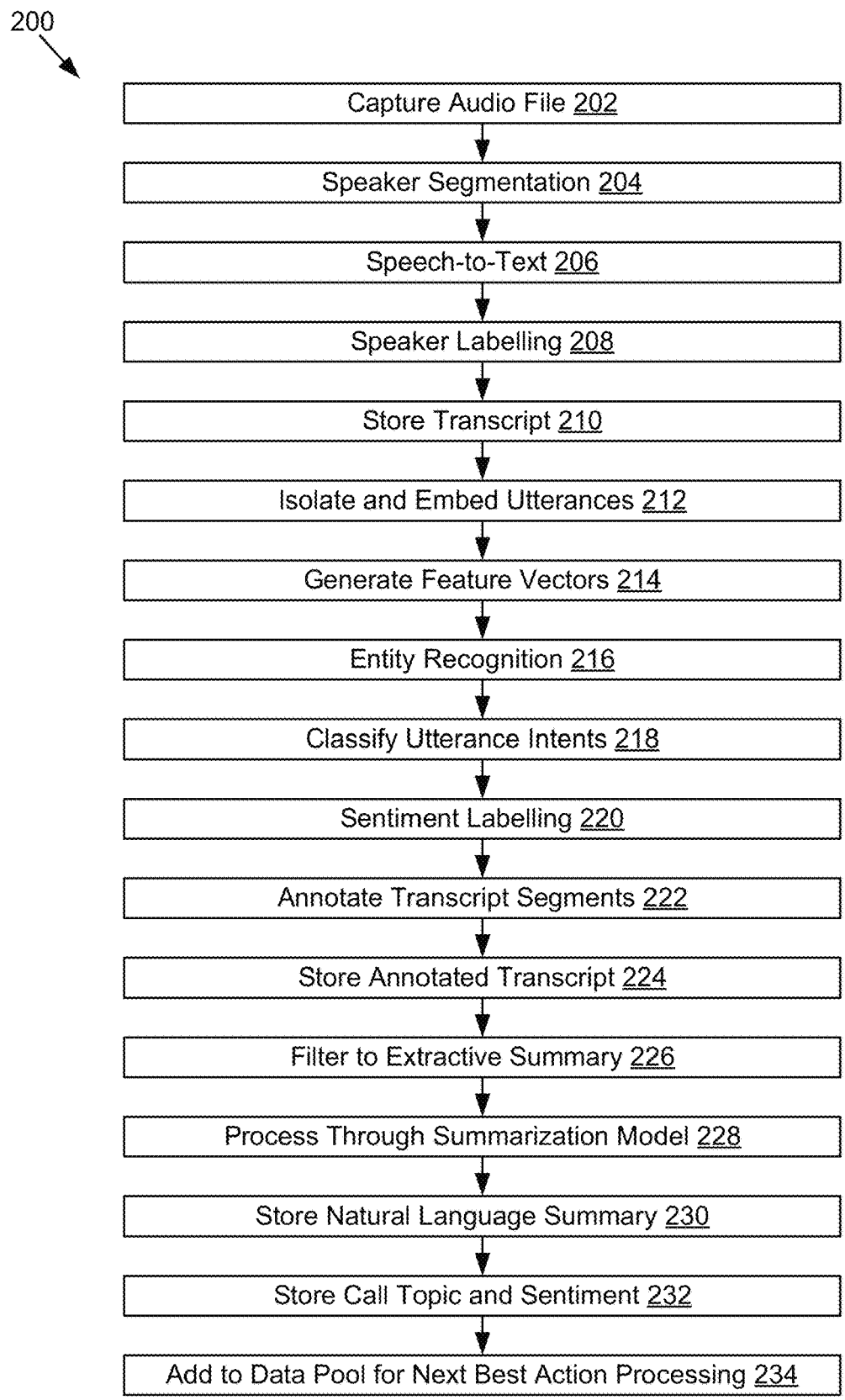
FIG. 2 illustrates a flow diagram of an example method for call summarization using filtered utterances.

FIG. 2 illustrates a flow diagram of a method 200 for call summarization using filtered utterances. For example, system 100 of FIG. 1 and/or system 700 of FIG. 7 may be operated according to method 200 to generate a natural language call summary from the audio file of a customer service call. In some configurations, method 300 may be implemented on one or more computer systems as a set of instructions stored in memory for execution by a processor.

At block 202, an audio file is captured. For example, a CSR computer system may allow a CSR to conduct a service call with a customer and an audio processing module may record the interactions between the CSR and the customer in an audio file or similar audio data object.

At block 204, the utterances in call may be segmented by speaker. For example, a speech recognition engine may use a speaker diarization model to segment the call audio into a series of utterances attributed to different speakers based on their distinct vocal patterns.

At block 206, the speech in the audio file may be converted into text. For example, the speech recognition engine may use a domain-specific speech-to-text model to convert the audio data into corresponding phonetic and/or natural language text.

At block 208, the text corresponding to each speaker may be labeled. For example, the speech recognition engine may use a speaker label classifier to classify each set of utterances for a particular speaker to a speaker role, such as CSR or customer.

At block 210, a transcript for the call may be stored. For example, the speech recognition engine may store a resulting transcript file or similar data object that includes the diarized text tagged with corresponding speaker labels to a database and linked to a call record and/or customer record corresponding to the call.

At block 212, each utterance may be isolated and embedded for processing through one or more natural language processing models. For example, a natural language processing engine may use each utterance defined in the tagging of the text transcript and generate corresponding numerical value vectors in a lower-dimensional space that represents similar words as similar values, while preserving semantic and syntactic relationships between words. In some configurations, a TF-IDF model and/or bag of words (BOW) model may be used for generating the embeddings.

At block 214, specific configurations of feature vectors may be generated for one or more natural language processing models. For example, the natural language processing engine may use a character-based BERT deep learning model to convert each utterance into a dense feature vector to support intent classification, entity recognition, and/or topic classification.

At block 216, feature vectors may be processed for entity recognition. For example, the natural language processing engine may use a multi-class classifier (and/or a series of such classifiers) trained for one or more sets key terms that represent relevant entities for tagging and/or further processing of the utterances. In some configurations, entity recognition may include topic classification for each utterance based on a multi-class classifier trained for a set of call topic labels, such as scheduling, benefits, change in contact information, etc.

At block 218, feature vectors may be processed to classify utterance intents. For example, the natural language processing engine may use a multi-class classifier trained for a set of intent labels, such as greeting, customer question, CSR answer, next step, etc.

At block 220, feature vectors may be processed for sentiment labeling. For example, the natural language processing engine may use a text sentiment model for labeling speaker sentiment for each utterance.

At block 222, the text transcript may be annotated in corresponding segments. For example, the natural language processing engine may use annotation logic and a corresponding markup language, such as hypertext markup language (HTML) or extensible markup language (XML), to tag each segment of text corresponding to utterances with corresponding tags for each label generated. In some configurations, tags may be used to annotate the text transcript according to multiple segmentation levels, such as sequences of adjacent utterances and/or terms or phrases within an utterance.

At block 224, the annotated transcript may be stored. For example, the natural language processing engine may store the annotated transcript as an annotated transcript file or similar data object and/or write the transcript and corresponding tag metadata to a database or another data structure accessible to other components of the system.

At block 226, the annotated transcript may be filtered to an extractive summary. For example, a call summarization engine may include filtering logic for a subset of tags or labels, such as filtering to a desired set of utterance intent labels, to output a subset of utterances selected as having a high correlation to call substance (i.e., the most important aspects of the call content).

At block 228, the extractive summary may be processed through a call summarization model. For example, the call summarization engine may use the feature vectors for the selected subset of utterances in the extractive summary as inputs to an abstractive summary model trained for domain-specific natural language call summarization.

At block 230, the natural language summary may be stored. For example, the call summarization engine may store the natural language summary as a natural language summary file or similar data object and/or write the summary text and corresponding tag metadata to a database or another data structure accessible to other components of the system.

At block 232, a call topic, call sentiment, and/or other summary metadata may be stored. For example, the call summarization engine may extract call topic and/or call sentiment based on processing topic and/or sentiment tags from the extractive summary and/or the annotated transcript to provide summary metadata labels for the call and related to the natural language call summary.

At block 234, the natural language call summary and corresponding metadata may be added to a data pool for next best action processing. For example, the natural language call summary and metadata tags may be associated with a call record and/or customer record and made available in an enterprise data warehouse used for further processing, such as determining next best action for customer service and/or marketing outreach.

Figure 3:
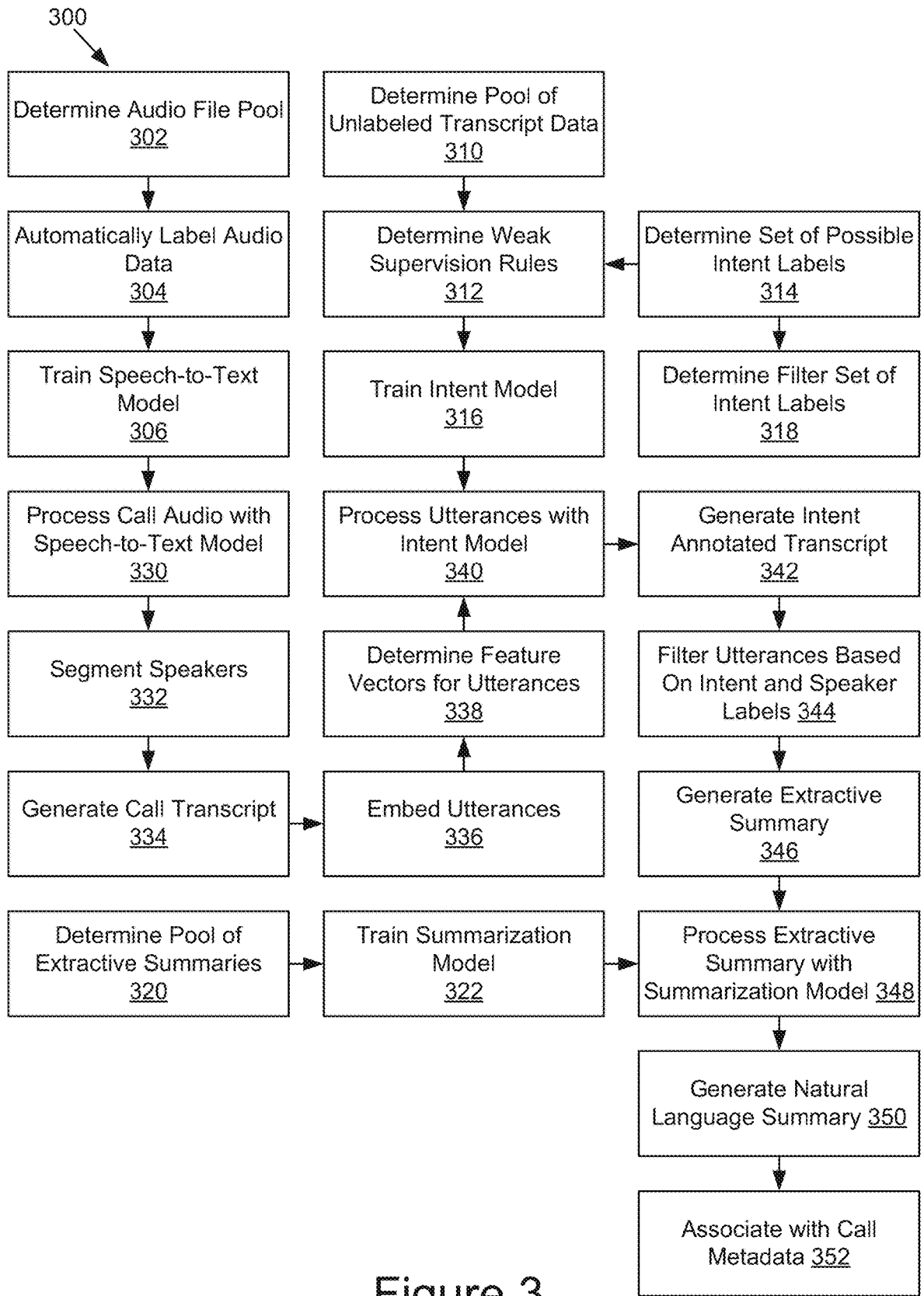
FIG. 3 is a flow diagram of an example method for training and using a computer system configured for call summarization.

FIG. 3 is a flow diagram of an example method 300 for training and using a computer system configured for call summarization. For example, system 100 of FIG. 1 and/or system 700 of FIG. 7 may be operated according to method 300 to generate a natural language call summary based on models trained from prior call data. In some configurations, method 300 may be implemented on one or more computer systems as a set of instructions stored in memory for execution by a processor. In some configurations, blocks 302-306, 310-316, and 320-322 may describe training phases during which one or more machine learning models are trained based on curated sets of training data. These training phases may be iteratively invoked during initial training and/or retraining based on performance feedback and modified training data sets that have been updated based on the ongoing operation of the system and processing of natural language summaries through the remaining blocks of method 300. For example, accuracy of the natural language summary and/or intermediate model outputs may be automatically evaluated against one or more confidence thresholds to trigger additional training or retraining iterations. In some configurations, CSRs may be used to evaluate natural language summary accuracy when a summary is displayed for a subsequent call and an accuracy rating value may be captured and used to determine ground truth values for including the corresponding audio file, unlabeled transcript data, and/or extractive summaries in subsequent model training iterations. Blocks 330-352 may be executed by the computer system at runtime to process each new customer service call audio file.

At block 302, a pool of audio file data may be determined. For example, an enterprise call center may maintain a data warehouse in which the recorded audio files of past calls are stored and catalogued with metadata, such as a database of metadata attributes describing each call in terms of date, time, duration, CSR, customer/member identifier, etc. A set of data may be determined based on metadata criteria and/or other automated filter criteria to select a training data set for a speech-to-text model.

At block 304, the audio data in the selected audio file pool may be automatically labeled. For example, an audio classifier model may be trained to identify specific key terms related to the domain of interest and preprocess audio data files to label the content of the audio files.

At block 306, a speech-to-text model may be trained. For example, a generic speech-to-text model trained on general speech recognition data may be retrained using domain specific call data mapped to specific key terms to modify the weighting coefficients of the model and improve performance for transcription of CSR calls for the specific domain.

At block 310, a pool of unlabeled transcript data may be determined. For example, the computer system may access or generate transcript files from the recorded audio files of past calls that are stored in the enterprise data warehouse. In some configurations, the speech-to-text model trained at block 306 may be used to generate the transcript data. Note that, in this context, unlabeled transcript data may include data that is not labeled with intent labels. For example, the transcript data generated at block 334 may include diarization and speaker identification that generates speaker labels for each utterance and those labels may be included in the set of data selected at block 310 as training data for the intent model.

At block 312, a set of weak supervision rules may be determined. For example, a set of heuristics for logically grouping call intents according to a curated set of intent labels may be developed. In some configurations, a cluster analysis or pre-existing set of intent labels and corresponding heuristics may be used and iteratively improved through human feedback to define a set of weak supervision intent labeling rules that enable automated training of the intent model.

At block 314, the set of possible intent labels may be determined. For example, an initial set of intent labels may be refined during the development of the weak supervision rules to cover all relevant categories of call or utterance intent for call analysis.

At block 316, the intent model may be trained. For example, a multi-class classifier may be trained based the training set of transcript data and weak supervision rules to classify each utterance in each transcript to one of the utterance intents and corresponding intent labels.

At block 318, the set of possible intent labels may be used to determine a filter set of intent labels. For example, a subset of intents, such as customer questions, CSR answers, and next steps, may be identified as relevant to generating extractive summaries for the call summarization model and selected for use at block 344.

At block 320, a pool of extractive summaries may be determined. For example, the computer system may access or generate extractive summary files from the intent annotated transcript files of past calls that are stored in the enterprise data warehouse. In some configurations, the utterance intent model trained at block 316 may be used to generate the intent annotated transcript data. The intent annotated transcript data may be filtered using the filter set of intent labels determined at block 318 to generate the extractive summary data used in the set of data selected at block 320 as training data for the natural language summarization model.

At block 322, a natural language summarization model may be trained. For example, a generic natural language summarization model may be retrained based on the training set of extractive summaries representing the domain-specific and intent-filtered transcript content to generate a specialized summarization model optimized for extractive call summarization of the most relevant utterances (by intent) in the call transcript.

At block 330, call audio for a customer service call may be processed with the speech-to-text model trained at block 306. For example, as new calls are handled by CSRs, the calls may be automatically processed for summarization by first processing the resulting call audio data through the trained speech-to-text model.

At block 332, speakers may be segmented in the call transcript. For example, the call audio may be processed through a diarization model to separate utterances by speaker and speaker audio may be processed through clustering and/or categorization models to assign speaker labels to each utterance.

At block 334, a call transcript may be generated. For example, a text file may be generated, diarized, and assigned tags denoting the bounds of each utterance and a corresponding speaker label.

At block 336, utterances may be embedded. For example, the computer system may isolate the text of each utterance for natural language processing.

At block 338, one or more feature vectors may be determined for each utterance. For example, dense feature vectors may be determined according to known natural language processing techniques, such as using a character-based BERT deep learning model to embed each utterance into a dense feature vector.

At block 340, the utterances may be processed with the utterance intent model. For example, the utterance intent classifier model trained at block 316 may be used to assign an intent label to each utterance based on the feature vector for that utterance.

At block 342, an intent annotated transcript may be generated. For example, based on the intent label assignments at block 340, each utterance may be tagged in the transcript file with an intent label.

At block 344, utterances may be filtered based on intent and speaker labels. For example, the filter set of intent labels may be used to exclude utterances with intent labels that do not meet the criteria of the filter set, which may be based on a combination of utterance intent and speaker, such as excluding greetings, confirmations, and utterances from automated response systems.

At block 346, an extractive summary may be generated. For example, the text and tags for the remaining utterances after applying the filters at block 344 may be assembled into an extractive summary transcript file.

At block 348, the extractive summary may be processed through the summarization model. For example, the extractive summary and the feature vectors corresponding to the remaining utterances may be processed through the natural language summarization model trained at block 322 to convert the utterances into a natural language summary.

At block 350, the natural language summary may be generated. For example, the output from the summarization model may be a text summary file or similar data object containing the text of natural language summary of the filtered utterances.

At block 352, the natural language summary may be associated with the call metadata. For example, the enterprise data warehouse may include a database for metadata associated with each call identifier and may include a field for the natural language summary or a link to the text summary file. Note that other metadata may be extracted during blocks 330-350 and may also be stored in metadata associated with the call identifier to further describe the content of the call.

Figure 4:
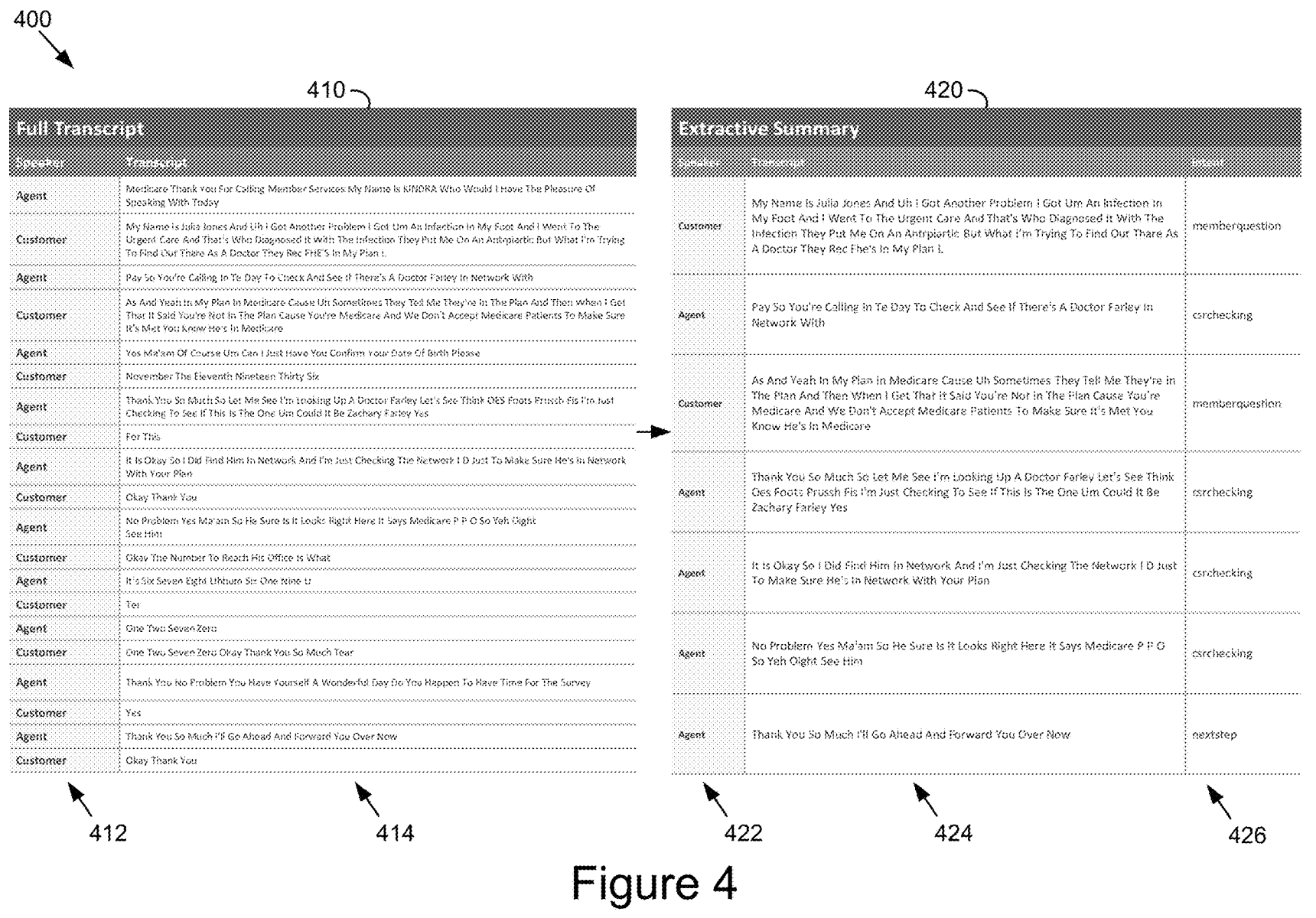

FIG. 4 illustrates a comparison 400 of an example call transcript 410 and resulting extractive summary 420. For example, call transcript 410 may represent a visual presentation of a transcript file generated by the speech-to-text model, diarized into utterance text 414, and labeled with speaker labels 412. In some configurations, call transcript 410 may be stored in a markup language file, such as HTML or XML, and include tags for defining utterances and associated speaker labels.

Extractive summary 420 may include speaker labels 422 and utterance text 424 corresponding to a filtered subset of utterances. Intent labels 426 may be included for each utterance. In the example shown, the filter set of utterance intent labels included the "member question", "csccheck-ing", and "nextstep" labels and may have excluded other intent labels, such as "greeting" and "customerconfirmation". In some configurations, extractive summary 420 may be stored in a similar markup language file and include additional tags for utterance intent and/or other key terms determined through processing of the transcript.

FIG. 5 illustrates a comparison 500 of extractive summary 420 and a resulting natural language summary 510. As described above, extractive summary 420 may include speaker labels 422, utterance text 424, and intent labels 426 based on the filtered subset of utterances. A natural language summarization model trained to the filtered set of utterances and for the specific domain of the customer service calls may more reliably generate an accurate natural language summary, as shown in natural language summary 510. Note that the natural language summary is not a direct mapping of the filtered utterances and does not attempt to summarize each utterance individually. The trained summarization model processes the set of filtered utterances as a whole and abstracts and summarizes the most important content in the set of utterances, removes redundancy, and ignores unnecessary elements. For example, while the next step of forwarding the customer to a satisfaction survey passed the intent labeling model and intent filtering, the summarization engine was still able to ignore the element as unrelated to the purpose of the rest of the call.

Figure 6:
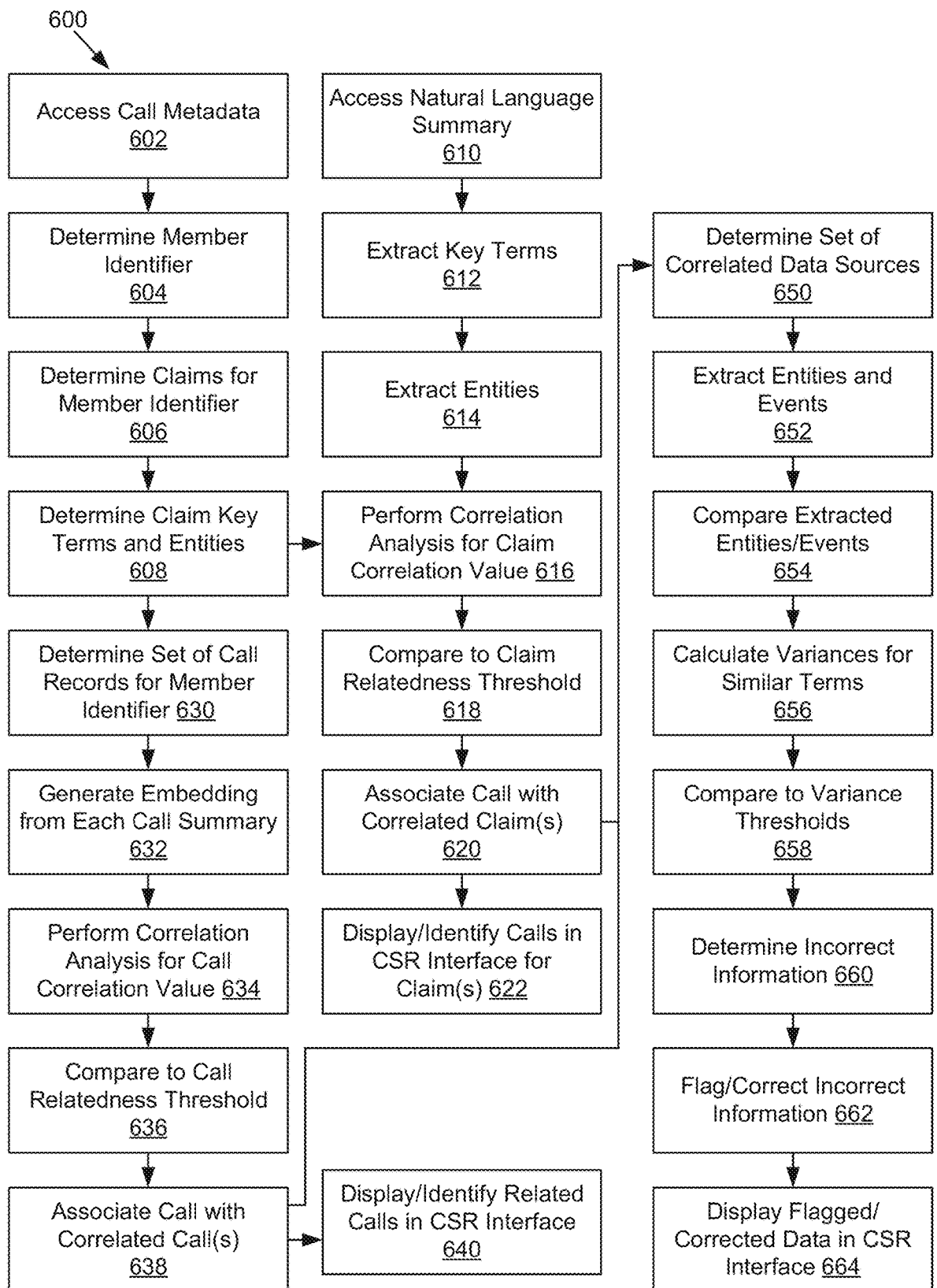
FIG. 6 is a flow diagram of an example method for post-processing and using a natural language summary.

FIG. 6 is a flow diagram of an example method 600 for post-processing and using a natural language summary. For example, system 100 of FIG. 1 and/or system 700 of FIG. 7 may be operated according to method 600 to post-process a natural language call summary to improve the quality of call summaries, augment call metadata, and support future customer support calls, outbound marketing, and customer service. In some configurations, method 600 may be implemented on one or more computer systems as a set of instructions stored in memory for execution by a processor. While method 600 is presented as a unitary post-processing method its various component blocks and series of processes may be operated independently. For example, in some configurations, blocks 602-608 and 630-640 may operate as a separate method for displaying related call summaries in a CSR interface. In some configurations, blocks 610-622 may operate as a separate method for displaying related call summaries for a specific claim or similar unifying event or identifier. In some configurations, call summaries related by content, customer, claim, etc. may be used for correction of call summaries as a separate method described by blocks 650-664. Method 600 may be described in terms of a call system for managing medical insurance inquiries, but may be used in other domains, such as medical services, pharmacy services, property/liability insurance, and other commercial endeavors that track membership and related events and customer inquiries.

At block 602, call metadata may be accessed related to a natural language summary. For example, a natural language summary generated and stored according to methods 200 and/or 300 may trigger additional processing by the computer system.

At block 604, a member or customer identifier may be determined. For example, each call record may be associated with a unique member or customer identifier, such as a customer number, used to index data associated with that customer in a database. In some configurations, the customer identifier may be input by the customer during the call process and/or identified by the CSR during call handling to be associated with the call record.

At block 606, claims may be determined for the member identifier. For example, each member identifier may be associated with one or more open and/or closed claims that are in process or have been processed and have associated claim records in the database. These claim records may be accessed by cross-referencing the member identifier with a corresponding set of claim identifiers associated with that member.

At block 608, key terms and entities associated with the claim may be determined. For example, claim records may include structured metadata describing events and entities associated with the claim, such as dates, locations, medical service, service providers, etc., and a subset of this metadata may be identified as key terms and/or entities for describing, cross-referencing, and comparing claim records.

At block 610, a natural language call summary may be accessed. For example, a new natural language call summary that is being post-processed according to method 600 may be accessed from a database.

At block 612, key terms may be extracted. For example, based on the processing in methods 200 and 300, key terms may be identified and stored in metadata associated with the call summary and/or call record. In some configurations, the computer system executing method 600 may run additional natural language detectors and/or classifiers to identify additional terms, such as medical terminology, in the content of the call summary text and store it as metadata.

At block 614, entities may be extracted. For example, based on the processing in methods 200 and 300, entities, such as customer/patient names, caregiver names, service provider names, etc., may be identified and stored in metadata associated with the call summary and/or call record. In some configurations the computer system executing method 600 may run additional natural language detectors and/or classifiers to identify additional entities in the content of the call summary text and store it as metadata.

At block 616, a correlation analysis may be performed between the call summary and each claim record associated with the member or customer identifier to determine a claim correlation value with each claim. For example, a correlation model may process feature vectors corresponding to the extracted key terms and/or entities from the claim records and the call summary to determine a claim correlation value between 0 and 1 for each combination of a claim record with the call summary.

At block 618, the claim correlation values may be compared to a claim relatedness threshold. For example, the computer system may compare each claim correlation value to a claim relatedness threshold that must be met to positively identify the call summary as relating to one or more claims, such as a claim relatedness threshold of 0.8 (80%). The threshold may be determined based on the number of terms being used, correlation across claims, and other factors.

At block 620, the call record may be associated with one or more correlated claims. For example, the computer system may add each claim identifier for each claim that met the claim relatedness threshold to the call record and/or add the call record identifier to each corresponding claim record.

At block 622, call metadata and/or the call summary may be displayed and/or identified by a link in the CSR interface for each claim. For example, when a CSR opens and views an interface display for a claim record, the visual representation of that claim record may include a display area including call metadata, such as date, time, and CSR name, and the text of the natural language call summary for any call records that have been associated with that claim.

At block 630, a set of call records may be determined for the member identifier. For example, in the same way that a new call record may be associated with a member or customer identifier, each prior call related to that customer may also be associated with that member or customer identifier and may be determined from the database by searching for call records associated with the member or customer identifier.

At block 632, an embedding may be generated from each call summary. For example, each call summary may be processed through a natural language model to generate a feature vector.

At block 634, a correlation analysis may be performed across combinations of call summaries to determine a call correlation value for each combination. For example, each pair of feature vectors determined at block 632 may be compared through a correlation model to generate a call correlation value between 0 and 1.

At block 636, the call correlation values may be compared to a call relatedness threshold. For example, the computer system may compare each call correlation value to a call relatedness threshold that must be met to positively identify the call summaries as relating to common subject matter, such as a call relatedness threshold of 0.6 (60%). The threshold may be determined based on the number of calls, general correlation across call summaries, and other factors. Note that the call relatedness threshold may be set to associate calls that may be of interest to a CSR processing or responding to another call, not necessarily requiring that they address the same claim or exact call purpose.

At block 638, the call record may be associated with one or more correlated calls. For example, the computer system may add each call record identifier for each call summary that met the call relatedness threshold to that call record in a reciprocal relationship.

At block 640, call metadata and/or the call summary may be displayed and/or identified by a link in the CSR interface for each related call. For example, when a CSR opens and views an interface display for a call record, the visual representation of that call record may include a display area including call metadata, such as date, time, and CSR name, and the text of the natural language call summary for any call records that have been associated with that call.

At block 650, a set of correlated data sources may be determined. For example, metadata from a call record, customer record, and/or claim record may be used as a source for entities, events, or other key words, and/or related call summaries (based on call relatedness from blocks 630-638 or claim relatedness from blocks 616-620) may provide correlated data sources for a new call summary.

At block 652, entities and events may be extracted from the correlated data sources. For example, entities and events may have been previously extracted into metadata and/or the data sources may be processed through a natural language detector or classifier to identify corresponding terms.

At block 654, extracted entities and events may be compared for similarity. For example, entities and events may be classified as a type, such as service provider, location, or medical procedure, and similar types may be compared.

At block 656, variances may be calculated for similar terms. For example, for each similar term a term variance value may be determined using a linguistic variance model. Note that variance calculation may be determined for repeated occurrences of similar terms and across more than two correlated data sources to provide weighted variances based on the number of sources.

At block 658, variances of the terms in the call summary may be compared to a variance threshold. For example, a variance threshold may be set to a low, but positive variance threshold value to correct small errors in terms, such as spelling or speech-to-text errors. Higher variance may indicate an entirely separate term.

At block 660, incorrect information may be determined at block 660. For example, the computer system may include correction logic that provides a set of rules for evaluating term variances based on the defined variance thresholds and correlated data sources. In some configurations, different data sources may be given more weight in determining errors and corrections. For example, member records may be treated as dispositive sources of member names and similar entity values and claim records may be treated as dispositive sources for locations, procedures, and providers related to a claim.

At block 662, incorrect information may be flagged or corrected. For example, the correction logic may include automation for correcting small variance errors, such as spelling/transcription, and/or may flag larger errors (substantially different entities/events) to identify the possible untrustworthy data to a CSR and/or provide an opportunity for human review and correction of the information. In some configurations, error correction and/or information reliability tags may be added to the markup file for the call summary.

At block 664, the call summary may be displayed in the CSR interface for the call with the corrected and/or flagged data. For example, when a CSR opens and views an interface display for a call record, the visual representation of that call record may include a display area including call metadata, such as date, time, and CSR name, and the text of the natural language call summary associated with that call. The visual representation of the call summary may include text color, highlighting, or formatting that indicates a correction and/or unreliable data (based on parsing the error correction tags in the markup) and may include links or other navigation features for reviewing both original and corrected data and/or providing human input and/or override of the incorrect information designations.

Figure 7:
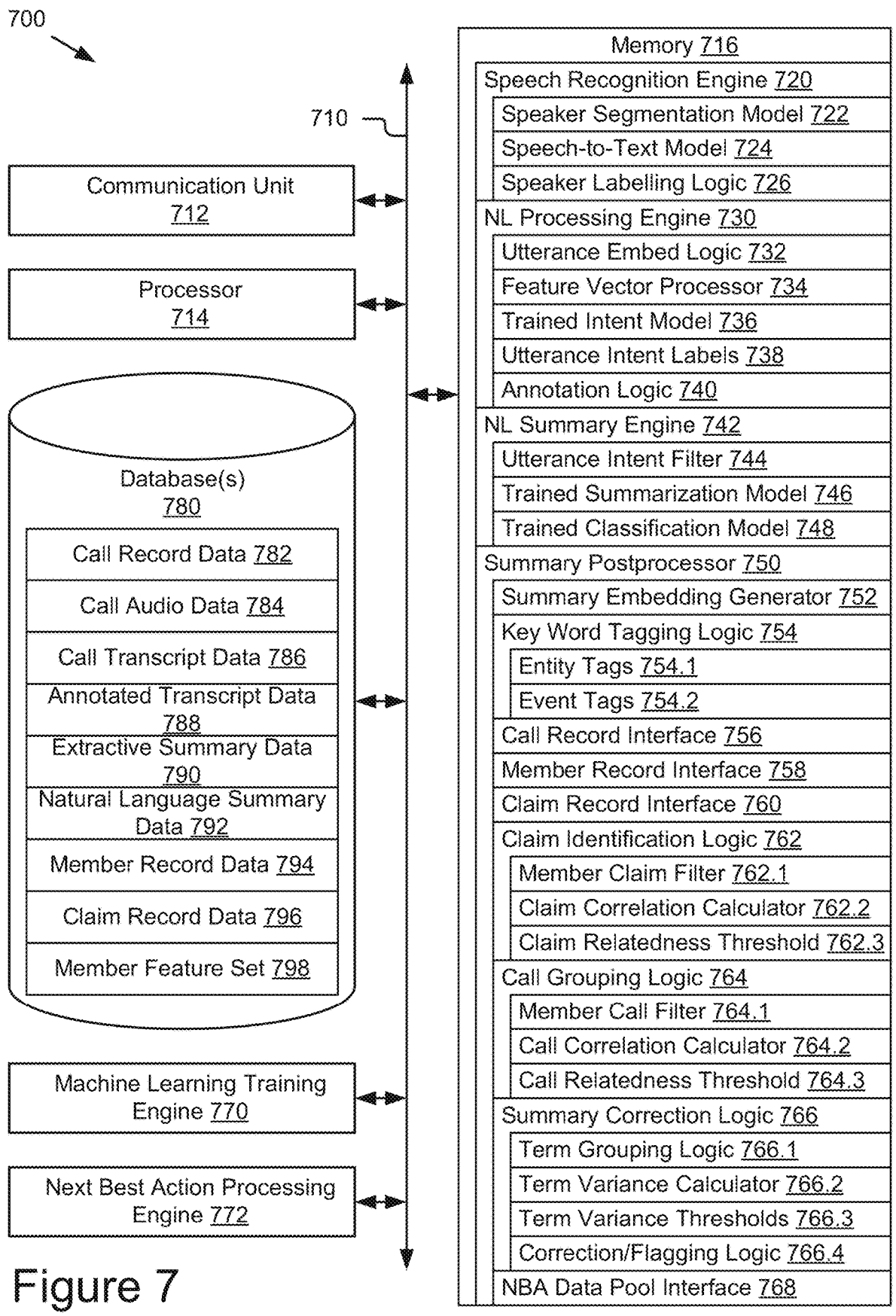
FIG. 7 is an example computer system configured for call summarization using filtered utterances.

FIG. 7 schematically shows selected modules of a CSR computer system 700. CSR computer system 700 may be configured with an architecture and/or hardware and may incorporate elements and configurations similar to those shown in FIGS. 1-6. For example, CSR computer system 700 may include selected modules related to generating and using call summarization based on filtered utterances. In some configurations, portions of CSR computer system 700 may be embodied in a CSR client system configured to access an enterprise computing system that hosts call processing and data warehousing to support the CSR client system. In some configurations, machine learning training engine 770 and next best action processing engine 772 may be modules or subsystems in the enterprise computing system and/or separate computing systems configured for machine learning training and/or data mining respectively.

CSR computer system 700 may include a bus 710 interconnecting at least one communication unit 712, at least one processor 714, and at least one memory 716. Bus 710 may include one or more conductors that permit communication among the components of CSR training module 700. Communication unit 712 may include any transceiver-like mechanism that enables CSR computer system 700 to communicate with other devices and/or systems. For example, communication unit 712 may include wired or wireless mechanisms for communicating with the CSR client 120 via the network 170. Processor 714 may include any type of processor or microprocessor that interprets and executes instructions, such as instructions stored in memory 716. Memory 716 may include a random access memory (RAM) or another type of dynamic storage device that stores information and instructions for execution by processor 714 and/or a read only memory (ROM) or another type of static storage device that stores static information and instructions for use by processor 714 and/or any suitable storage element such as a hard disk or a solid-state storage element.

CSR computer system 700 may include or have access to one or more databases 780, which may correspond to databases 180 described herein. Databases 780 may include one or more data structures or records for storing call data and related metadata. In some configurations, databases 780 may include at least a portion of an enterprise data warehouse comparing a combination of structured and unstructured data that may be accessed using queries or commands, such as structured query language (SQL) commands, directed to one or more servers providing a data interface. In some configurations, databases 780 may include call record data 782, such as a collection of call record data objects organized by a unique call record identifier and indexing call audio data 784 and related metadata. In some configurations, databases 780 may include call transcript data 786, annotated transcript data 788, extractive summary data 790, and natural language summary data 792 in corresponding data objects associated with the call record and source call audio data. For example, each of these data object may be generated by CSR computer system 700 in the process of generating the natural language summary. Databases 780 may also include member record data 794, such as a collection of member or customer record data objects organized by a unique member or customer identifier and indexing data associated with a particular member or customer. Databases 780 may also include claim record data 796, such as a collection claim record data objects organized by unique claim numbers and indexing data associated with each insurance claim submitted or generated for a member. Databases 780 may include a member feature set 798 comprised of data derived from the other records and associated with a particular member that may be used for data analysis to direct outreach, outbound marketing, and customer service interactions, such as though next best action processing engine 772.

CSR computer system 700 may include a plurality of modules or subsystems that are stored and/or instantiated in memory 716 for execution by processor 714. For example, memory 716 may include a speech recognition engine 720 configured to convert audio data into a call transcript. Memory 716 may include a natural language (NL) processing engine 730 configured to annotate the content of a call transcript to generate an annotated transcript including utterance intent labels. Memory 716 may include a natural language summary engine 742 configured to generate a natural language call summary from the annotated transcript by filtering utterances based on their intent labels and summarizing the resulting subset of utterances. Memory 716 may include a summary postprocessor 750 configured to postprocess call summaries to associate and correct call summaries for display to and use by CSRs. In some configurations, machine learning training engine 770 and/or next best action processing engine 772 may be instantiated in memory 716 and/or accessed through communication unit 712.

Speech recognition engine 720 may include functions, interfaces, and data structures for using one or more trained machine learning models to generate call transcript data from call audio data. For example, speech recognition engine 720 may receive or access a call audio file comprised of audio data recorded during a customer service call and use a series of models and corresponding automated logic to convert the audio into a text transcript comprised of a series of utterances attributed to the speakers participating in the call. In some configurations, the audio data may be processed by a trained speaker segmentation model 722 to perform speaker diarization, where the bounds of each utterance from one speaker change to the next may be defined and tagged in the audio file, related metadata, and/or resulting text transcript. In some configurations, the audio data may be processed by a speech-to-text model 724 to convert the audio data into corresponding text, such as the text representation of the words spoken in each utterance. In some configurations, the audio data may be processed by speaker labeling logic 726 to assign speaker types or other speaker identifiers to each utterance. For example, a speaker identification model may use audio features to determine each unique speaker in the call and use a classification model to process utterances from each speaker to assign a speaker type, such as member, CSR, automated call system, etc. Speech recognition engine 720 may output a call transcript data object comprised of the call text segmented by utterance and tagged with a speaker label for each utterance.

Natural language processing engine 730 may include functions, interfaces, and data structures for using one or more trained machine learning models to modify the call transcript from speech recognition engine 720 with content tagging based on automated analysis of the text in the transcript. For example, natural language processing engine 730 may receive or access the call transcript data object and use a series of models and corresponding automated logic to add annotations to the transcript data object as tags and/or generate metadata associated with defined fields and/or position indexes associated with the transcript data object. In some configurations, utterance embed logic 732 may include logic for handling each utterance for converting it into a dense feature vector using feature vector processor 734. For example, utterance embed logic 732 may sequentially process the text of each utterance through character-based BERT or a similar transformer to generate a corresponding feature vector. In some configurations, a trained intent model 736 may process the feature vectors for each utterance to classify each utterance according to the speaker's intent. For example, trained intent model 736 may include a multi-class classifier trained for a master set of utterance intent labels 738 and may use the classifier output to assign a specific intent label to each utterance. In some configurations, annotation logic 740 may annotate the transcript data object with content-based tags, including utterance intent labels 738, determined for one or more segments in the transcript file, such as each utterance. In some configurations, additional classifiers may be trained for identifying key terms within the utterances, such as entities and events that may be relevant to the specific content of the call, and annotation logic 740 may support additional content tagging and/or generation of metadata associated with the call transcript and/or call record. Natural language processing engine 730 may output an annotated transcript data object comprising content tags (in addition to the utterance boundaries and speaker tags in the original transcript).

Natural language summary engine 742 may include functions, interfaces, and data structures for using one or more trained machine learning models to generate a natural language call summary from the annotated transcript. For example, natural language summary engine 742 may receive or access the annotated call transcript data object and use a series of models and corresponding automated logic to generate a natural language summary and categorize the call. In some configurations, an utterance intent filter 744 may receive and filter the annotated call transcript based on utterance intent labels. For example, utterance intent filter 744 may include filtering logic for a filter subset of the utterance intent labels to include in an extractive summary, where the filter subset is less than all of the labels and includes those that most closely correlate to highest priority call activity. The resulting extractive summary may be stored in databases 780 and/or directly provided to trained summarization model 746 and/or trained classification model 748 for processing. Excluded utterances may not be processed by trained summarization model 746 and trained classification model 748. In some configurations, trained summarization model 746 may process the filtered set of utterances in the extractive summary to generate a natural language summary. For example, trained summarization model 746 may be based on a general summarization model that has been retrained for summarizing the filtered utterances of the extractive summary based on domain-specific extractive summaries and corresponding ground truth summaries that capture the most relevant customer service call issues in a readable natural language format. In some configurations, trained classification model 748 may process the extractive summary to determine an overall topic for the call. For example, a classifier may be trained for a set of call topic labels and use the more refined input of the extractive summary and/or the natural language call summary to determine the call topic label. Natural language summary engine 742 may output a natural language summary data object comprising the text of the natural language summary. In some configurations, the natural language call summary may be tagged with the call topic label (or labels) and/or the call topics may be stored in call record metadata.

Summary postprocessor 750 may include functions, interfaces, and data structures for processing the natural language call summary to improve access, display, and use of the call summary by CSRs and/or other systems. For example, summary postprocessor 750 may receive a natural language call summary data object and use a series of automated processing models and corresponding automated logic to associate the natural language summary and corresponding call record with other records and/or use correlated data sources to correct terms in the natural language summary prior to display to and use by the CSRs. In some configurations, a summary embedding generator 752 may process the natural language summary to generate feature vectors for use on other processing models. For example, summary embedding generator 752 may process the text of the call summary through character-based BERT or a similar transformer to generate a corresponding feature vector. In some configurations, key word tagging logic 754 may process the feature vectors to identify and tag key words or terms appearing the natural language summary. For example, one or more natural language detectors and/or classifiers may be trained to identify key terms, such as entities and events, and assign corresponding labels, such as entity tags 754.1 and/or event tags 754.2. In some configurations, entity tags 754.1, event tags 754.2, and/or other clusters of functionally related terms may correspond to different key term types to assist in comparing similar types. Summary postprocessor 750 may include a next best action (NBA) data pool interface 768 configured to add call summaries, feature vectors, and related metadata (such as key words) to the NBA data pool for use by next best action processing engine 772.

Summary postprocessor 750 may include one or more interfaces for accessing data records and finding correlations between the call summary and other records, such as other call records and/or claim records in databases 780. Summary postprocessor 750 may include a call record interface 756 configured to search and access call records and their associated data. For example, call record interface 756 may use the call record identifier for the call summary to access other data in the call record, such as date, time, CSR name, etc., for postprocessing. In some configurations, call record interface 756 may also enable access to other call records, such as prior call records, for use in call grouping logic 764 to find related call records. Member record interface 758 may be configured for search and access of member records and, more specifically, the member record associated with the call summary. For example, call summaries may be associated with a call record that is, in turn, associated with a member record based on a member identifier that was determined at the time of the call. Claim record interface 760 may be configured for search and access of claim records and, more specifically, claim records associated with the member record associated with the call. For example, when a claim is submitted or otherwise created for a member, a claim record with a unique claim identifier is generated and associated with the member record.

In some configurations, claim identification logic 762 may identify one or more claims that are relevant to a call summary. For example, by identifying related claims, the call summary may be associated with and displayed when a CSR accesses the relevant claim records, such as during a subsequent customer service call. Claim identification logic 762 may include a member claim filter 762.1 configured to determine the set of claims associated with the relevant member identifier for the call summary, such as by accessing a set of claims identified in the member record or searching the claim records for the member identifier. Claim correlation calculator 762.2 may include a correlation model that can use the feature vector and/or key words from the natural language summary and a claim description and/or key words from the claim record to determine statistical correlation between the call summary and each claim for that member. The correlation model may output a claim correlation value for each claim relative to the call summary. One or more claim relatedness thresholds 762.3 may be used to evaluate the resulting claim correlation values. For example, claim relatedness threshold 762.3 may allow the system to automatically determine related claims and handle cases where no claims or multiple claims are related to a call (rather than simply selecting the highest claim correlation value and assuming that the most correlated claim is correct). Based on claim relatedness threshold 762.3 being met, one or more claim records may be reciprocally associated with the call record and call summary to allow the CSR interface to display the call summary when the corresponding claim records are accessed.

In some configurations, call grouping logic 764 may identify one or more other calls that are relevant to a call summary. For example, by identifying related calls, the call summary may be associated with and displayed when a CSR accesses any of the relevant call records, such as during a subsequent customer service call. Call grouping logic 764 may include a member call filter 764.1 configured to determine the set of calls associated with the relevant member identifier for the call summary, such as by accessing a set of call records identified in the member record or searching the call records for the member identifier. Call correlation calculator 764.2 may include a correlation model that can use the feature vectors and/or key words from each natural language summary to determine statistical correlation between the call summaries for that member. The correlation model may output a call correlation value for each call relative to the call summary. One or more call relatedness thresholds 764.3 may be used to evaluate the resulting call correlation values. For example, call relatedness threshold 764.3 may allow the system to automatically determine related calls and handle cases where no other calls or multiple calls are related to a call (rather than simply selecting the highest call correlation value and assuming that the most correlated call is correct). Based on call relatedness threshold 764.3 being met, one or more call records may be reciprocally associated with the call record and call summary to allow the CSR interface to display the call summary when the corresponding call records are accessed and/or group calls in a call list displayed when the member record is accessed.

In some configurations, summary correction logic 766 may use multiple data sources to automatically correct key terms in the natural language summary. For example, summary correction logic may receive a call summary, determine other data sources for key terms, such as entities and events, and perform one or more variance calculations to determine the similarity or dissimilarity and index correction logic to either autocorrect or flag. Term grouping logic 766.1 may use a group of terms associated with one or more other data sources, such as a member record and/or call or claim records identified as related, and group them according to type categorization using a classification model trained for domain specific entity or event types. Term variance calculator 766.2 may calculate variance across the different data sources for terms having the same type. Term variance thresholds 766.3 may be used to evaluate the calculate variances to determine whether there is a minor variance that may be autocorrected or a larger variance that may require flagging for human verification and/or trigger other automated processing by correction/flagging logic 766.4. Correction/flagging logic 766.4 may include a rules engine and rule set for determining how to process different term types based on their variance values, variance thresholds, and data sources. For example, correction/flagging logic 766.4 may treat a high variance for a term with known value in a reliable data source, such as the member name from the member record, as a term that may be autocorrected to the known value, but may merely flag variations without a clearly authoritative source of correction. In some configurations, where more than two data sources of similar reliability are used, a consensus approach may be used for determining the correct term to use. Summary correction logic 766 may output additional labels and/or markup for indicating incorrect or suspicious terms and may include multiple versions of the term to be displayed to the CSR during subsequent calls. In some configurations, the CSR interface may allow the CSR to manually update, accept, or ignore incorrect or suspicious terms. The corrected and/or tagged call summary may be stored to databases 780 for recall during subsequent access to the call record and/or call summary.

Machine learning training engine 770 may include functions, interfaces, and data structures for training the various machine learning models used by speech recognition engine 720, NL processing engine 730, NL summarization engine 742, and summary postprocessor 750. For example, machine learning training engine 770 may use databases 780 and the historical data pools it includes to generate training data pools and apply the training functions described above with regard to method 300 in FIG. 3. Machine learning training engine 770 may include a machine learning training toolkit that supports supervised, week supervision, and known ground truth based training functions. Machine learning training engine 770 may generate various metrics, such as reliability metrics, that may be compared to a threshold for evaluating the acceptability of a model and end a training sequence. For example, a model may be trained or retrained on data until model acceptance criteria, such as a model acceptance metric meeting a target acceptance metric threshold, is met and the model (and generated coefficients) are ready for deployment. In some configurations, machine learning training engine 770 may operate on specialized hardware computer systems optimized and dedicated to machine learning training and may export the resulting models to the runtime servers processing new call data. In some configurations, the data generated from new calls may be fed back to machine learning training engine 770 for retraining and improving the various domain-specific models.

Next best action processing engine 772 may include functions, interfaces, and data structures for using data pools in databases 780 to perform data mining and direct marketing, member outreach, and customer service. For example, next best action processing engine 772 may aggregate member data that may be relevant to determining whether specific member outreach and/or targeted marketing should be directed to that member for any given campaign of information, services, or offers. In some configurations, next best action processing engine 772 may be used to generate information, services, or offers to be presented to that member during a future interaction, such as a customer service call, retail interaction, or outreach campaign. Next best action processing engine 772 may be part of a separate computer system optimized for data mining and interfacing with multiple data source and next action systems, which may include the CSR clients as both data sources (through databases 780) and next action output, such as additional information to be provided or offers to be made as part of a customer service call.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method, comprising:
   determining a training data pool comprised of a plurality of call transcript data objects;
   determining a plurality of training utterances and corresponding feature vectors for the plurality of call transcript data objects;
   iteratively determining a set of weak supervision intent labelling rules for training a trained intent model;
   iteratively processing the plurality of training utterances and corresponding feature vectors through the trained intent model to determine weighting coefficients for the trained intent model and at least one model acceptance metric;
   generating a master set of intent labels for the trained intent model;
   accessing a call transcript data object for a customer service call;
   determining a plurality of utterances attributed to a plurality of speakers in the customer service call;
   generating a feature vector for each utterance of the plurality of utterances;
   processing each feature vector through the trained intent model to assign an intent label to each utterance;
   filtering, based on a filter set of intent labels, the plurality of utterances to generate an extractive summary data object, wherein:
      the filter set of intent labels is a selected subset of the master set of intent labels; and
      the extractive summary data object comprises;
         a subset of the plurality of utterances; and
         corresponding intent labels and speaker identifiers for the subset of the plurality of utterances; and
   generating, based on the extractive summary data object and a trained summarization model, a natural language summary data object for the customer service call.

2. The computer-implemented method of claim 1, further comprising:
   associating the natural language summary data object with a call record for the customer service call; and
   automatically displaying, on an interface display of a customer service representative computing system, a visual representation of the natural language summary data object in response to the customer service representative computing system accessing the call record.

3. The computer-implemented method of claim 1, further comprising:
   classifying, based on the extractive summary data object and a trained classification model, a call topic of the customer service call; and
   associating a call topic label for the call topic with the natural language summary data object.

4. The computer-implemented method of claim 1, further comprising:
   accessing an audio data object for the customer service call;
   determining, from the audio data object and using a trained speaker segmentation model, the plurality of speakers in the customer service call;
   converting, using a trained speech-to-text model, the audio data object to the call transcript data object;
   labelling the plurality of speakers in the call transcript data object; and
   embedding the plurality of utterances in the call transcript data object, wherein determining the plurality of utterances is based on embeddings in the call transcript data object.

5. The computer-implemented method of claim 1, further comprising:
   generating, from the natural language summary data object, an embedding and at least one corresponding feature vector for the natural language summary data object; and
   storing, associated with a member identifier for the customer service call, the embedding and at least one corresponding feature vector for processing through at least one automated processing model.

6. The computer-implemented method of claim 5, further comprising:
   determining a plurality of claim identifiers associated with the member identifier;
   determining, based on the natural language summary data object and a plurality of claim records corresponding to the plurality of claim identifiers, at least one claim correlation value for the natural language summary data object;
   determining, based on a comparison of the at least one claim correlation value and a claim relatedness threshold, at least one related claim identifier from the plurality of claim identifiers; and
   associating the at least one related claim identifier with a call record for the customer service call.

7. The computer-implemented method of claim 5, further comprising:
   determining at least one prior call record associated with the member identifier and comprising at least one prior natural language summary data object;
   determining, based on the natural language summary data object and the at least one prior natural language summary data object, at least one call correlation value for the natural language summary data object;
   determining, based on a comparison of the at least one call correlation value and a call relatedness threshold, at least one related call record from the at least one prior call record;
   associating the at least one related call record with a call record for the customer service call; and
   automatically displaying, on an interface display of a customer service representative computing system, a visual representation of the natural language summary data object in response to the customer service representative computing system accessing the at least on related call record.

8. The computer-implemented method of claim 5, further comprising:
   extracting, from the natural language summary data object, at least one key term having a key term type;

determining, based on the member identifier and the key term type, a plurality of data records comprising corresponding key terms;
determining variance values among the at least one key term and the corresponding key terms;
determining, based on the variance values, the at least one key term is in error; and
correcting, based on the corresponding key terms, the at least on key term in the natural language summary data object.

9. The computer-implemented method of claim 5, further comprising:
associating the embedding and at least one corresponding feature vector for the natural language summary data object with a member feature set;
processing, using the at least one automated processing model, the member feature set to determine a next best action for the member identifier; and
automatically initiating, based on the next best action, communication to a member associated with the member identifier.

10. A system, comprising:
one or more processors; and
a memory storing instructions that, when executed, cause the one or more processors to:
access a call transcript data object for a customer service call;
determine a plurality of utterances attributed to a plurality of speakers in the customer service call;
generate a feature vector for each utterance of the plurality of utterances;
process each feature vector through a trained intent model to assign an intent label to each utterance;
filter, based on a filter set of intent labels, the plurality of utterances to generate an extractive summary data object, wherein the extractive summary data object comprises:
a subset of the plurality of utterances; and
corresponding intent labels and speaker identifiers for the subset of the plurality of utterances;
generate, based on the extractive summary data object and a trained summarization model, a natural language summary data object for the customer service call;
generate, from the natural language summary data object, an embedding and at least one corresponding feature vector for the natural language summary data object;
store, associated with a member identifier for the customer service call, the embedding and at least one corresponding feature vector for processing through at least one automated processing model;
associate the embedding and at least one corresponding feature vector for the natural language summary data object with a member feature set;
process, using the at least one automated processing model, the member feature set to determine a next best action for the member identifier; and
automatically initiate, based on the next best action, communication to a member associated with the member identifier.

11. The system of claim 10, wherein the instructions further comprise instructions to:
associate the natural language summary data object with a call record for the customer service call; and
automatically display, on an interface display of a customer service representative computing system, a visual representation of the natural language summary data object in response to the customer service representative computing system accessing the call record.

12. The system of claim 10, wherein the instructions further comprise instructions to:
classify, based on the extractive summary data object and a trained classification model, a call topic of the customer service call; and
associate a call topic label for the call topic with the natural language summary data object.

13. The system of claim 10, wherein the instructions further comprise instructions to:
access an audio data object for the customer service call;
determine, from the audio data object and using a trained speaker segmentation model, the plurality of speakers in the customer service call;
convert, using a trained speech-to-text model, the audio data object to the call transcript data object;
label the plurality of speakers in the call transcript data object; and
embed the plurality of utterances in the call transcript data object, wherein determining the plurality of utterances is based on embeddings in the call transcript data object.

14. The system of claim 10, wherein the instructions further comprise instructions to:
determine a training data pool comprised of a plurality of call transcript data objects;
determine a plurality of training utterances and corresponding feature vectors for the plurality of call transcript data objects;
iteratively determine a set of weak supervision intent labelling rules for training the trained intent model;
iteratively process the plurality of training utterances and corresponding feature vectors through the trained intent model to determine weighting coefficients for the trained intent model and at least one model acceptance metric; and
generate a master set of intent labels for the trained intent model, wherein the filter set of intent labels is a selected subset of the master set of intent labels.

15. The system of claim 10, wherein the instructions further comprise instructions to:
determine a plurality of claim identifiers associated with the member identifier;
determine, based on the natural language summary data object and a plurality of claim records corresponding to the plurality of claim identifiers, at least one claim correlation value for the natural language summary data object;
determine, based on a comparison of the at least one claim correlation value and a claim relatedness threshold, at least one related claim identifier from the plurality of claim identifiers; and
associate the at least one related claim identifier with a call record for the customer service call.

16. The system of claim 10, wherein the instructions further comprise instructions to:
determine at least one prior call record associated with the member identifier and comprising at least one prior natural language summary data object;
determine, based on the natural language summary data object and the at least one prior natural language summary data object, at least one call correlation value for the natural language summary data object;

determine, based on a comparison of the at least one call correlation value and a call relatedness threshold, at least one related call record from the at least one prior call record;

associate the at least one related call record with a call record for the customer service call; and automatically display, on an interface display of a customer service representative computing system, a visual representation of the natural language summary data object in response to the customer service representative computing system accessing the at least on related call record.

17. The system of claim 10, wherein the instructions further comprise instructions to:

extract, from the natural language summary data object, at least one key term having a key term type;

determine, based on the member identifier and the key term type, a plurality of data records comprising corresponding key terms;

determine variance values among the at least one key term and the corresponding key terms;

determine, based on the variance values, the at least one key term is in error; and correct, based on the corresponding key terms, the at least on key term in the natural language summary data object.

18. A non-volatile computer readable memory storing instructions for:

accessing a call transcript data object for a customer service call;

determining a plurality of utterances attributed to a plurality of speakers in the customer service call;

generating a feature vector for each utterance of the plurality of utterances;

processing each feature vector through a trained intent model to assign an intent label to each utterance;

filtering, based on a filter set of intent labels, the plurality of utterances to generate an extractive summary data object, wherein the extractive summary data object comprises:
 a subset of the plurality of utterances; and
 corresponding intent labels and speaker identifiers for the subset of the plurality of utterances;

generating, based on the extractive summary data object and a trained summarization model, a natural language summary data object for the customer service call;

determining a plurality of claim identifiers associated with a member identifier;

determining, based on the natural language summary data object and a plurality of claim records corresponding to the plurality of claim identifiers, at least one claim correlation value for the natural language summary data object;

determining, based on a comparison of the at least one claim correlation value and a claim relatedness threshold, at least one related claim identifier from the plurality of claim identifiers; and associating the at least one related claim identifier with a call record for the customer service call.

19. A system, comprising:
one or more processors; and
a memory storing instructions that, when executed, cause the one or more processors to:
 access a call transcript data object for a customer service call;
 determine a plurality of utterances attributed to a plurality of speakers in the customer service call;
 generate a feature vector for each utterance of the plurality of utterances;
 process each feature vector through a trained intent model to assign an intent label to each utterance;
 filter, based on a filter set of intent labels, the plurality of utterances to generate an extractive summary data object, wherein the extractive summary data object comprises:
  a subset of the plurality of utterances; and
  corresponding intent labels and speaker identifiers for the subset of the plurality of utterances;
 generate, based on the extractive summary data object and a trained summarization model, a natural language summary data object for the customer service call;
 determine at least one prior call record associated with a member identifier and comprising at least one prior natural language summary data object;
 determine, based on the natural language summary data object and the at least one prior natural language summary data object, at least one call correlation value for the natural language summary data object;
 determine, based on a comparison of the at least one call correlation value and a call relatedness threshold, at least one related call record from the at least one prior call record;
 associate the at least one related call record with a call record for the customer service call; and
 automatically display, on an interface display of a customer service representative computing system, a visual representation of the natural language summary data object in response to the customer service representative computing system accessing the at least on related call record.

20. A system, comprising:
one or more processors; and
a memory storing instructions that, when executed, cause the one or more processors to:
 access a call transcript data object for a customer service call;
 determine a plurality of utterances attributed to a plurality of speakers in the customer service call;
 generate a feature vector for each utterance of the plurality of utterances;
 process each feature vector through a trained intent model to assign an intent label to each utterance;
 filter, based on a filter set of intent labels, the plurality of utterances to generate an extractive summary data object, wherein the extractive summary data object comprises:
  a subset of the plurality of utterances; and
  corresponding intent labels and speaker identifiers for the subset of the plurality of utterances;
 generate, based on the extractive summary data object and a trained summarization model, a natural language summary data object for the customer service call;
 extract, from the natural language summary data object, at least one key term having a key term type;
 determine, based on a member identifier and the key term type, a plurality of data records comprising corresponding key terms;
 determine variance values among the at least one key term and the corresponding key terms;
 determine, based on the variance values, the at least one key term is in error; and correct, based on the corresponding key terms, the at least on key term in the natural language summary data object.

\* \* \* \* \*